United States Patent
Sharma et al.

(10) Patent No.: US 12,010,716 B2
(45) Date of Patent: Jun. 11, 2024

(54) USER EQUIPMENT THAT TRANSMITS IDENTITY INFORMATION FOR AN INTERFERENCE ANALYSIS

(71) Applicant: Sony Group Corporation, Tokyo (JP)

(72) Inventors: Vivek Sharma, Basingstoke (GB); Brian Alexander Martin, Basingstoke (GB); Yuxin Wei, Basingstoke (GB); Hideji Wakabayashi, Basingstoke (GB); Shinichiro Tsuda, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/683,355

(22) Filed: Mar. 1, 2022

(65) Prior Publication Data

US 2022/0191876 A1  Jun. 16, 2022

Related U.S. Application Data

(63) Continuation of application No. 16/337,398, filed as application No. PCT/EP2017/075431 on Oct. 5, 2017, now Pat. No. 11,272,515.

(30) Foreign Application Priority Data

Oct. 7, 2016 (EP) .................................. 16192788

(51) Int. Cl.
*H04L 12/54* (2022.01)
*H04B 7/06* (2006.01)
(Continued)

(52) U.S. Cl.
CPC ........ *H04W 72/541* (2023.01); *H04B 7/0617* (2013.01); *H04B 17/318* (2015.01);
(Continued)

(58) Field of Classification Search
CPC ... H04W 72/082; H04W 24/08; H04W 24/10; H04B 17/318; H04B 17/336; H04B 7/0617
See application file for complete search history.

(56) References Cited

U.S. PATENT DOCUMENTS 8,948,038 B1  2/2015  Trott et al.
9,768,929 B2 *  9/2017  Wang .................... H04L 5/0053
(Continued)

FOREIGN PATENT DOCUMENTS

EP            2849526 A2    3/2015
WO      2013/033907 A1    3/2013
(Continued)

OTHER PUBLICATIONS

International Search Report dated Jan. 22, 2018, for PCT/EP2017/075431 filed on Oct. 5, 2017, 24 pages.
(Continued)

*Primary Examiner* — Abdelnabi O Musa
(74) *Attorney, Agent, or Firm* — XSENSUS LLP

(57) ABSTRACT

A user equipment for a mobile telecommunications network has a circuitry which is configured to: receive a signal from an entity of a mobile telecommunications network, thereby determining identity information about the determined entity; and transmit the identity information to the mobile telecommunications network for interferences analysis.

15 Claims, 5 Drawing Sheets

(51) Int. Cl.
*H04B 17/318* (2015.01)
*H04B 17/336* (2015.01)
*H04W 24/08* (2009.01)
*H04W 24/10* (2009.01)
*H04W 28/02* (2009.01)
*H04W 72/541* (2023.01)
*H04L 5/00* (2006.01)

(52) U.S. Cl.
CPC .......... *H04B 17/336* (2015.01); *H04W 24/08* (2013.01); *H04W 24/10* (2013.01); *H04W 28/0284* (2013.01); *H04L 5/0048* (2013.01)

(56) References Cited

U.S. PATENT DOCUMENTS

| | | | |
|---|---|---|---|
| 10,548,181 B2 * | 1/2020 | Siomina | H04W 76/28 |
| 2011/0183662 A1 * | 7/2011 | Lee | H04W 36/0005 |
| | | | 455/422.1 |
| 2011/0183669 A1 * | 7/2011 | Kazmi | H04J 11/0086 |
| | | | 455/434 |
| 2012/0040621 A1 * | 2/2012 | Jung | H04W 24/10 |
| | | | 455/67.11 |
| 2012/0243638 A1 | 9/2012 | Maltsev et al. | |
| 2013/0044621 A1 * | 2/2013 | Jung | H04B 17/345 |
| | | | 370/336 |
| 2013/0122891 A1 * | 5/2013 | Palm | H04W 8/02 |
| | | | 455/422.1 |
| 2013/0303145 A1 * | 11/2013 | Harrang | H04W 24/10 |
| | | | 455/418 |
| 2014/0242974 A1 * | 8/2014 | Lee | H04W 76/27 |
| | | | 455/422.1 |
| 2016/0119856 A1 * | 4/2016 | Hwang | H04W 48/12 |
| | | | 370/328 |
| 2016/0182145 A1 * | 6/2016 | Shi | H04L 49/555 |
| | | | 455/436 |
| 2016/0359755 A1 * | 12/2016 | Li | H04W 8/20 |
| 2017/0317731 A1 * | 11/2017 | Chen | H04W 24/10 |
| 2018/0042000 A1 * | 2/2018 | Zhang | H04B 7/088 |
| 2018/0359790 A1 * | 12/2018 | Ingale | H04W 8/22 |

FOREIGN PATENT DOCUMENTS

| | | | | |
|---|---|---|---|---|
| WO | WO-2013033907 A1 * | 3/2013 | ........ | H04W 72/1215 |
| WO | 2016/012144 A1 | 1/2016 | | |
| WO | 2016/094173 A1 | 6/2016 | | |
| WO | 2016/128213 A1 | 8/2016 | | |
| WO | 2016/150501 A1 | 9/2016 | | |
| WO | 2016/206998 A1 | 12/2016 | | |

OTHER PUBLICATIONS

3GPP, "Technical Specification Group Radio Access Network; Study on Scenarios and Requirements for Next Generation Access Technologies", Release 14, 3GPP TR 38.913, V0.4.0, Jun. 2016, pp. 1-35.

Ericsson, "Security in NR", 3GPP TSG-RAN WG2 Meeting No. 95 Tdoc R2-165543, Gothenburg, Sweden, Aug. 22-26, 2016, pp. 1-4.

OFCOM, "Spectrum above 6 GHz for future mobile communications", Jan. 16, 2015, 62 pages.

Etsi, "Universal Mobile Telecommunications System (UMTS); LTE; Universal Terrestrial Radio Access (UTRA) and Evolved Universal Terrestrial Radio Access (E-UTRA); Radio Measurement Collection for Minimization of Drive Tests (MDT); Overall Description; Stage 2", 3GPP TS 37.320 Version 13.1.0 Release 13, Apr. 2016, 28 pages.

* cited by examiner

USER EQUIPMENT THAT TRANSMITS IDENTITY INFORMATION FOR AN INTERFERENCE ANALYSIS

CROSS-REFERENCE TO RELATED APPLICATIONS

The present application is a continuation of U.S. application Ser. No. 16/337,398, filed Mar. 28, 2019, which is based on PCT filing PCT/EP2017/075431, filed Oct. 5, 2017, and claims priority to European Patent Application No. 16192788.4 filed Oct. 7, 2016, the entire contents of each are incorporated herein by reference.

TECHNICAL FIELD

The present disclosure generally pertains to user equipment and base stations for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). A NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

Moreover, generally, it is known that network operators regularly perform drive tests, in order to ensure coverage and capacity in their networks. Typically, this requires physical presence at every location within the area covered by the network operation for collecting measurements.

The 3GPP document TS 37.320, "Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2", Release 11, introduces standardized Minimization of Drive Tests (MDT) mechanisms, whereby few UEs, configured with MDT configuration, collect measurements and report to the network. MDT measurements cover LTE and UMTS radio access technologies (RATS) and may cover measurements for NR as well.

One such contribution proposing enhancements to MDT for NR can be found in 3GPP TSG-RAN WG" #95, Tdoc R2-165543, "Security in NR", Gothenburg, Sweden, 22-26 Aug. 2016.

Although, generally, methods for MDT for NR are known, it is desirable to provide a user equipment and an entity which can be used in the field of MDT.

SUMMARY

According to a first aspect, the disclosure provides a user equipment for a mobile telecommunications network, comprising circuitry configured to receive a signal from an entity of a mobile telecommunications network, thereby determining identity information about the determined entity; and transmit the identity information to the mobile telecommunications network for interferences analysis.

According to a second aspect, the disclosure provides a user equipment for a mobile telecommunications network, comprising circuitry configured to determine beam information, based on a received signal of the beam emitted by an entity of a mobile telecommunications network and transmit the beam information to the mobile telecommunications network for interferences analysis.

According to a third aspect, the disclosure provides a user equipment for a mobile telecommunications network, comprising circuitry configured to determine a beacon originating from an entity of a wireless network, which is based on a Radio Access Technology which differs from the Radio Access Technology of the mobile telecommunications network; and transmit information about the Radio Access Technology to the mobile telecommunications network for interferences analysis.

According to a fourth aspect, the disclosure provides a user equipment for a mobile telecommunications network, comprising circuitry configured to determine receipt of a signal originating from an entity based on at least one of a Signal-to-Noise Ratio measurement, a Channel Quality Indicator measurement, and a Received Signal Strength Indicator measurement; and transmit measurement information of the received signal to the mobile telecommunications network for interferences analysis.

According to fifth aspect, the disclosure provides a user equipment for a mobile telecommunications network, comprising circuitry configured to stop signaling for a predetermined time in response to receipt of signaling stop information from the mobile telecommunications network.

According to a sixth aspect, the disclosure provides a base station for a mobile telecommunications network, comprising circuitry configured to cause a user equipment to perform an interference measurement; and stop transmission for a predetermined time, wherein the user equipment performs the measurement at least partially during the predetermined time.

According to a seventh aspect, the disclosure provides a base station for a mobile telecommunications network, comprising circuitry configured to obtain information about a signal originating from an entity; transmit signaling stop information to a user equipment; and analyze the information about the signal for determining the entity emitting the signal for interferences analysis.

According to an eighth aspect, the disclosure provides a user equipment for a mobile telecommunications network, comprising circuitry configured to receive, from the mobile telecommunications network, information about a presence of at least one reference signal to be measured; and measure the at least one reference signal for interferences analysis.

According to a ninth aspect, the disclosure provides a base station for a mobile telecommunications network, comprising circuitry configured to transmit, to a user equipment of the mobile telecommunications network, information about a presence of at least one reference signal to be measured for interferences analysis.

According to a tenth aspect, the disclosure provides a user equipment for a mobile telecommunications network, comprising circuitry configured to receive, from the mobile telecommunications network, a configuration to perform a measurement on a received signal; perform the measurement; and transmit a result of the measurement to the mobile telecommunications network.

According to an eleventh aspect, the disclosure provides a base station for a mobile telecommunications network, comprising circuitry configured to configure a user equipment of the mobile telecommunications network to perform a measurement on a received signal.

According to a twelfth aspect, the disclosure provides a user equipment for a mobile telecommunications network comprising circuitry configured to establish a connection to an entity at a first frequency; and perform an interference measurement at a second frequency, the second frequency being higher than the first frequency.

Further aspects of the disclosure are set forth in the dependent claims, the following description and the drawings.

BRIEF DESCRIPTION OF THE DRAWINGS

Embodiments of the present disclosure are explained by way of example with respect to the accompanying drawings, in which.

DETAILED DESCRIPTION OF EMBODIMENTS

Figure 1:
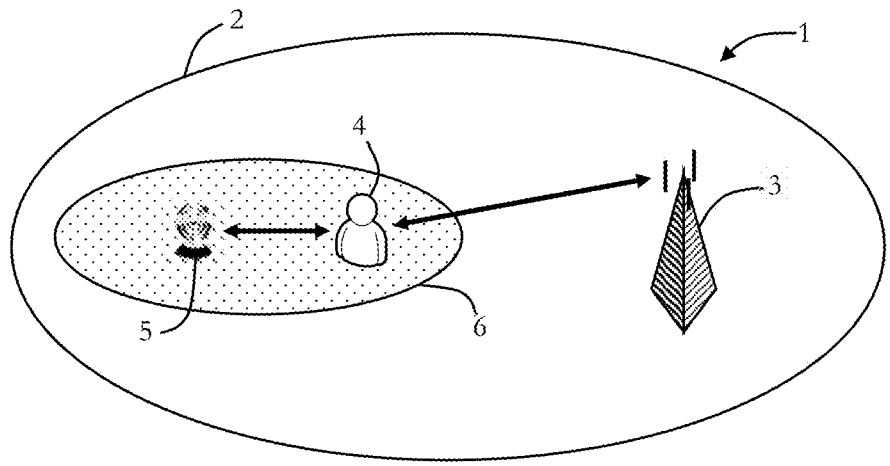
FIG. 1 illustrates an exemplary Radio Access Network.

FIG. 1 illustrates an embodiment of the present disclosure. Before a detailed description of the preferred embodiments is made, some general explanations are given.

As mentioned in the outset, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). A NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

Moreover, generally, it is known that network operators regularly perform drive tests, in order to ensure coverage and capacity in their networks. Typically, this requires physical presence at every location within the area covered by the network operation for collecting measurements.

The 3GPP document TS 37.320, "Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2", Release 11, introduces standardized Minimization of Drive Tests (MDT) mechanisms, whereby few UEs, configured with MDT configuration, collect measurements and report to the network. MDT measurements cover LTE and UMTS radio access technologies (RATs) and may cover measurements for NR as well.

One such contribution proposing enhancements to MDT for NR can be found in 3GPP TSG-RAN WG" #95, Tdoc R2-165543, "Security in NR", Gothenburg, Sweden, 22-26 Aug. 2016.

Two deployment scenarios for NR are present in some embodiments:

i) Non-standalone case, wherein LTE is a Master and NR is secondary or vice versa, and ii) Standalone case, wherein NR is deployed as an independent RAT.

One of the candidate frequencies for NR is >6 GHz, in some embodiments, wherein these frequencies are not only for indoor deployment but also used for outdoor scenarios, as also discussed in the 3GPP technical report TR 38.913, "Study on Scenarios and Requirements for Next Generation Access Technologies". According to section 6.1.2 of TR 38.913, dense urban microcellular deployment scenarios may focus in some embodiments on macro Transmission/Reception Points (TRPs) with or without micro TRPs and high user densities and traffic loads in city centers and dense urban areas. The key characteristics of this deployment scenario are high traffic loads, outdoor and outdoor-to-indoor coverage. This scenario will be interference-limited, using macro TRPs with or without micro TRPs. A continuous cellular layout and the associated interference shall be assumed.

Some of its attributes are listed in Table 6.1.2-1 of TR 38.913, from which it can be taken that the carrier frequency may have two layers, one around 4 GHz and the other around 30 GHz. Hence, in some embodiments, the operating frequency of NR may be in the range of 30 GHz without limiting the disclosure in that regard. Other scenarios are, in some embodiments, urban macro and high speed environments whereby a relay is used, as it is also mentioned in section 6.1.4 of TR 38.913.

Due to operation on high frequencies, beam forming and/or beam sweeping may be used, e.g. in NR, in some embodiments, which may result in situations where not all areas are lit simultaneously and interference may change dynamically. Further, if mobile relays are used in the network, as it is generally known, interferences may vary dynamically in some embodiments. Mobile relays may be deployed with or without beam forming.

Hence, it has been recognized that there are, amongst others, three factors which may be considered in some embodiments for the deployment of NR and MDT measurements, namely higher frequency (e.g. than in LTE), beam sweeping and tracking, and mobile relays or mobile base-stations, which may travel around and thereby cause dynamic interferences. In some embodiments, a user equipment which is connected mode may be tracking the beam(s).

In some embodiments, also combinations of these three factors may exist in a deployment. For example, an NR operating at high frequency using beam sweeping and/or tracking and having a presence of a mobile base-station. Such mobile base-stations may be operating on unlicensed or shared spectrum. In some embodiments, such deployments may require new parameters to be collected from MDT measurements.

It has also been recognized that one source of interference while NR is operating at higher frequencies may be to/from other systems already operating at such higher frequencies, such as e.g. terrestrial microwave point-to-point link (p-t-p link), earth stations, police, short range point to point, WLAN, etc. In addition, there could be dynamic interference generated due to use of beam to sweeping and presence of mobile base-stations, as also mentioned above.

Terrestrial microwave transmission may interfere with NR transmission due to adjacent channel(s) or second harmonics. For example, if a 28 GHz frequency is used for NR then microwave links operating on 14 GHz may cause interference (second harmonics), or WLAN operating at 60 GHz may get interference from 30 GHz NR.

In some embodiments, microwave p-t-p links are designed taking into account that the mobile broadband operation will take place at lower frequencies and that mostly antennas for cellular and p-t-p backhaul are co-located. The p-t-p link radiation pattern may be elliptical whereby maximum radiation may be in the center of the link, but leakage may occur at the antenna itself. An operator may control such interference emanating from its own network in some embodiments, e.g. by proper frequency planning, control of all other deployments may not be possible or not practicable. A corrective action may be shifting the operating frequencies or finding a time-sharing pattern.

In some embodiments, earth stations, e.g. base stations, eNodeB or the like, may experience interference from a NR base station, a NR mobile base station in the vicinity or the like.

At present, an exact operating frequency of NR is not fixed, but, in some embodiments, RF hardware costs and complexity of operating at frequencies above 6 GHz are considered. Known incumbent systems (satellites, microwave radios) operating at frequencies above 6 GHz can afford customized and expensive hardware. However, this will not be the case with mobile handsets, at least in some embodiments. In some embodiments, RF filters and interference cancellers are to be cheap and a signaling based solution may be implemented in some embodiments. In addition, an operator may plan its own network manually, but the operator may have no control of competitor's network deployment and other sources operating on these frequencies (one example was LTE interfering with Freeview).

In some embodiments, interferences may occur in the following examples, wherein frequency examples of existing RATS are based on publicly available information provided by OFCOM, which is the communications regulator in the UK.

| NR frequency | Interfering/ interfered frequency band | Description/notes |
| --- | --- | --- |
| 28 GHz | 13.75-14 GHz Standard frequency and time signal - satellite (earth to space) | Second harmonics from maritime radio location transmitters The frequency range is already shared and has interference issues listed, so it may be crowded at a few locations and may cause interference with 28 GHz |
| 60 GHz | License exempt short range devices 61.0-61.5 GHz | If short range device and NR UE operate in the same region e.g. indoor IDC solution may need to be extended if short range devices operating at these frequencies are integrated in the device |
| 6 GHz 30 GHz | Radio determination applications 17.1-17.3 GHz 26 DBm | Frequency range has high transmitting power |
| 6 GHz 28 GHz | Road transport and traffic telematics | V2V 3rd harmonics of 28 GHz may interfere with 77- |
| 60 GHz | 77-81 GHz 55 dBm- 3rd harmonics of 28 GHz | 81 GHz |

The table gives some examples of standardized frequency ranges where interferences may occur. Besides the example of microwave p-t-p as a source of interference, in some embodiments, also other sources of interference may be present, such as new standards/devices operating on higher frequency bands. For instance, there is a tendency to open these higher frequency bands worldwide and, for example, wireless local area network (WLAN) is already operating at 60 GHz.

It is worth mentioning that, in some embodiments, interference is static in nature at lower frequencies, because the antenna configuration does not change. Even, if beam forming is used at lower frequencies in some embodiments, all areas may be lit uniformly and interference does not change due to antenna position and MDT measurements currently do not include any parameter related to beam-forming.

In some embodiments, MDT is one framework to which some embodiments pertain, but some embodiments also pertain to channel occupancy measurements or RSSI (received signal strength indication) measurements. Channel occupancy measurement on the frequencies configured by the network was agreed as part of LAA (Licensed Assisted Access) work, according to which a UE reports percentages of measurement samples, wherein an RSSI value is above a threshold on an unlicensed spectrum.

Consequently, some embodiments pertain to a user equipment for a mobile telecommunications network (or system). The user equipment may be, for example, e.g. a mobile phone, a computer, tablet, tablet personal computer or the like including a mobile communication interface, or any other device which is able to perform a mobile telecommunication via, for example, LTE(-A), such as a hot spot device with a mobile communication interface. The user equipment has a circuitry, which may include a processor, microprocessor, dedicated circuit, and other electronic components. The circuitry is configured to receive a signal from an entity of a mobile telecommunications network, thereby determining identity information about the determined entity; and transmit the identity information to the mobile telecommunications network for interferences analysis. The entity may be a user equipment, a base station, e.g. an eNodeB (LTE, NR, LTE-A, etc.), hotspot device, a (mobile) relay, a transmission/reception point, or the like.

The identity information may identify a source of interference, which may be, in general any kind of source which transmits data wirelessly. The identity information is transmitted to the mobile telecommunications network for interference analysis, which may be performed, for example, by a MDT server or the like.

In some embodiments, the circuitry is further configured to measure a quality of the received signal and to transmit the quality of the received signal to the mobile telecommunications network. The information about the quality of the received signal may include at least one of a Received Signal Strength Indicator (RSSI), a Channel Quality Indicator (CQI), a Reference Signal Received Power (RSRP), and a Reference Signal Received Quality (RSRQ).

The identity information may be identity information about a mobile base station, about a mobile Transmission-Reception Point or the like.

The received signal may be an uplink reference signal in a Physical Random Access Channel from the entity.

Some embodiments pertain to a user equipment for a mobile telecommunications network, comprising circuitry configured to determine beam information, based on a received signal of the beam emitted by an entity of a mobile telecommunications network and to transmit the beam information to the mobile telecommunications network for interferences analysis. The beam information may be capable for identifying a specific beam transmitted by a specific entity.

Some embodiments pertain to a user equipment for a mobile telecommunications network, comprising circuitry configured to determine a beacon originating from an entity of a wireless network, which is based on a Radio Access Technology which differs from the Radio Access Technology of the mobile telecommunications network, and to transmit information about the Radio Access Technology to the mobile telecommunications network for interferences analysis.

Some embodiments pertain to a user equipment for a mobile telecommunications network, comprising circuitry configured to determine receipt of a signal originating from an entity based on at least one of a Signal-to-Noise Ratio measurement, a Channel Quality Indicator measurement, and a Received Signal Strength Indicator measurement, and transmit measurement information of the received signal to the mobile telecommunications network for interferences analysis.

The transmission of the measurement information may be performed after termination of at least one of the Signal-to-Noise Ratio measurement, the Channel Quality Indicator measurement, and the Received Signal Strength Indicator measurement.

Some embodiments pertain to a user equipment for a mobile telecommunications network, comprising circuitry configured to stop signaling for a predetermined time in response to receipt of signaling stop information from the mobile telecommunications network. Thereby, interferences which may be caused by a user equipment, e.g. by working as mobile base station, may be suppressed.

Some embodiments pertain to a base station, e.g. eNodeB based on LTE, NR or the like, for a mobile telecommunications network, comprising circuitry configured to cause a user equipment to perform an interference measurement, and stop transmission for a predetermined time, wherein the user equipment performs the measurement at least partially during the predetermined time. The interference measurement can be based on MDT measurements, channel occupancy measurements or the like, as described herein.

Some embodiments pertain to a base station, e.g. eNodeB based on LTE, NR or the like, for a mobile telecommunications network, comprising circuitry configured to obtain information about a signal originating from an entity, transmitting signaling stop information to a user equipment, and analyzing the information about the signal for determining the entity emitting the signal for interferences analysis.

Some embodiments pertain to a user equipment for a mobile telecommunications network, comprising circuitry configured to receive, from the mobile telecommunications network, to information about a presence of at least one reference signal to be measured, and measure the at least one reference signal for interferences analysis.

Some embodiments pertain to a base station for a mobile telecommunications network, comprising circuitry configured to transmit, to a user equipment of the mobile telecommunications network, information about a presence of at least one reference signal to be measured for interferences analysis.

Some embodiments pertain to a user equipment for a mobile telecommunications network, comprising circuitry configured to receive, from the mobile telecommunications network, a configuration to perform a measurement on a received signal, perform the measurement, and transmit a result of the measurement to the mobile telecommunications network.

The (interference) measurement may be performed as part of a Minimization of Drive Tests measurement configuration. The measurement may be performed as part of a mobility measurement configuration. The measurement may be performed as part of a channel occupancy measurement configuration. The measurement may be performed as part of a user equipment information request/response configuration.

The circuitry may be further configured to transmit an availability of the measurement to the mobile communications network, wherein the availability may be transmitted as a Radio Link Failure report.

Some embodiments pertain to a base station for a mobile telecommunications network, comprising circuitry configured to configure a user equipment of the mobile telecommunications network to perform a measurement on a received signal. The measurement may be performed as part of a Minimization of Drive Tests measurement configuration. The measurement maybe performed as part of a mobility measurement configuration. The measurement may be performed as part of a channel occupancy measurement configuration. The measurement may be performed as part of a user equipment information request/response configuration.

The circuitry may be further configured to receive, from the user equipment, an availability of the measurement.

The circuitry may be further configured to receive the availability of Radio Link Failure reports.

Hence, in some embodiments, the UE assists the network by providing measurements, which may include information as discussed above, wherein a collection of exemplary embodiments is summarized in the following.

In some embodiments, if the interferer was another cell or TRP operating on NR frequencies and to the UE is able to detect the cell/TRP, then, as also discussed above, the UE may provide information about TRP, location, timestamp, measurements, etc., as in legacy MDT. Additionally, it may provide and/or log beam information and an identifier (identity information) of the mobile base-station and/or the mobile TRP, as discussed above. In some embodiments, the network may reserve physical layer identifiers only for mobile base stations (the intention is to identify measurements related to mobile base stations in the post processing), if applicable.

In some embodiments, MDT measurements are performed by the UE on configured measurement objects (frequencies) and there is one object per frequency. In case of a shared spectrum, in some embodiments, a measurement object may correspond to or include multiple frequencies, as shared spectrum may be available in chunks and vary in different areas. Hence, in some embodiments, a measurement object may include more than a single frequency.

If the interferer was another RAT, such as WLAN, and the UE is able to detect the beacon of the WLAN, then it may report and/or log the interferer type as WLAN or any other system, as discussed above.

If the interferer is unknown, but detected, e.g. based on SNR, CQI or RSSI measurements, as discussed above, then the UE may log and/or report the measurements, as discussed above. An instantaneous message may be sent to the network either based on network configuration (threshold, time above/below threshold) or implicitly.

At the time, when MDT was introduced, CRS (Cell Reference Signals; used for measurements) was transmitted at regular intervals. DRS (Discovery Reference Signals) was introduced later and, in some embodiments, NR may also use DRS. Hence, for performing, serving and neighboring cell measurements, in some embodiments, the UE knows the presence of reference signals, as also discussed above. As in some embodiments, beam sweeping is used, it might be more challenging to detect the reference signals. Hence, in some embodiments, as discussed above, the network informs the UE about the presence of reference signals for measurements of serving and neighboring cells. Furthermore, reference signals for common and dedicated beams may also be provided by the network.

Some embodiments pertain to a user equipment for a mobile telecommunications network comprising circuitry configured to establish a connection to an entity at a first frequency and to perform an interference measurement at a second frequency, the second frequency being higher than the first frequency. The interference measurement can be based on MDT measurements, channel occupancy measurements or the like, as described herein. Establishing a connection may also include camping of the user equipment. The entity may be a base station, e.g. eNodeB based on NR or LTE, or any other entity, as also mentioned above.

In some embodiments, it might be challenging for a base station or UE to perform normal transmission/reception on NR and at the same time to try to identify the source of unknown interference. Hence, as discussed above, in some embodiments, a NR base-station may command UEs (all UEs in the cell or UEs active for MDT measurements purposes) to stop UL/DL using explicit signaling (RRC/L2 protocols/PHY).

In some embodiments, the Network, e.g. a base station (LTE/NR eNodeB or the like), may configure above measurements as part of MDT measurement configuration, mobility measurement configuration, channel occupancy measurement configuration, or UE information request/response configuration, as discussed above. Alternatively, the UE may report whenever such measurements are available (modelled as RLF report), as discussed above.

In some embodiments, an operator collecting measurements as discussed herein, wherein a source of interference is unknown, may refer to a (national) database and may thereby detect the source of interference. In some embodiments, the detection of interferences may be done rarely or even only once, but in embodiments where, for example, whitespace is used more dynamically, sources of interference may vary in the network and such measurements could be collected frequently or in real time before any corrective action is performed by the network operator. Whitespace interference may appear and disappear quickly, in some embodiments, such that a robust mechanism may be provided for a UE to log the measurements. A concept of TTT (time to trigger) can be introduced, in some embodiments, even for logging (FIT exists for normal measurements) such that the network gains confidence from a measurement sample. In some embodiments, a MDT server may be linked to a national database in the operator network.

In some embodiments, the UE may report if and where it detects abnormal signals, e.g. signals (power) without the corresponding pilots, or pilots without the corresponding sys-info, or cells which are not possible to access, or do not provide the right security certificates although claiming to be an operator cell. These reports can be used by the network operator to detect ongoing jamming.

As discussed, in some embodiments, MDT measurements are extended by including new information, as described above, in the solutions sections. This new information may result, as discussed, in some embodiments, in new UE behavior for collecting these measurements, related to known and unknown sources of interference, and in more dynamic interfering situations compared to legacy MDT. As discussed, some embodiments also pertain to a base station for receiving these new measurements from the UE. In addition, in order to detect unknown interferences, a base station may indicate UEs not to transmit for a certain duration, as discussed above.

In some embodiments, the UE may send uplink reference signals in NR operating at higher frequencies. This UE behavior may help the network to know the UE location and radio conditions of the UE. If such a mechanism is agreed for NR, then MDT framework also change in some embodiments. Then, for example, instead that the UE logs based on downlink reference signals, the UE may include channel information while transmitting UL reference signals. This channel information may be similar to CQI. The UE may log this information or send it immediately in some embodiments.

Returning to FIG. 1, there is illustrated an embodiment of a Radio Access Network (RAN) 1. The RAN 1 comprises a radio cell 2 and a base station 3, which provides or establishes the radio cell 2. The base station 3 is exemplary a LTE eNodeB, but it can also be a NR eNodeB or the like, and it is connected to a core network. In the radio cell 2, there is a user equipment (UE) 4 having a connection to the base station 3, which is represented by the arrow between the UE 4 and the base station 3.

The UE 4 is also connected to an entity 5, which may be any entity emitting electromagnetic radiation, such as another UE or base station, a Wi-Fi access point, an electric device unintentionally emitting electromagnetic radiation, or a weather event such as a thunderstorm, a solar wind, or polar lights, etc. In the present embodiment, entity 5 is a NR hotspot which is located inside the radio cell 2, although, in another embodiment, the entity 5 may be located (partially or completely) outside of the radio cell 2.

The electromagnetic radiation emitted by the entity 5 covers an area 6, in which the UE 4 is located. The electromagnetic radiation emitted by the entity 5 may, for example, include a frequency component within a frequency range used in the connection between the UE 4 and the base station 3, or in any other existing or planned connection in which the UE 4, the base station 3, or any other component of the RAN 1 is involved. For example, the electromagnetic radiation emitted by the entity 5 may cause an electromagnetic interference with the connection between the UE 4 and the base station 3, and may reduce the link quality of the connection.

Figure 2:
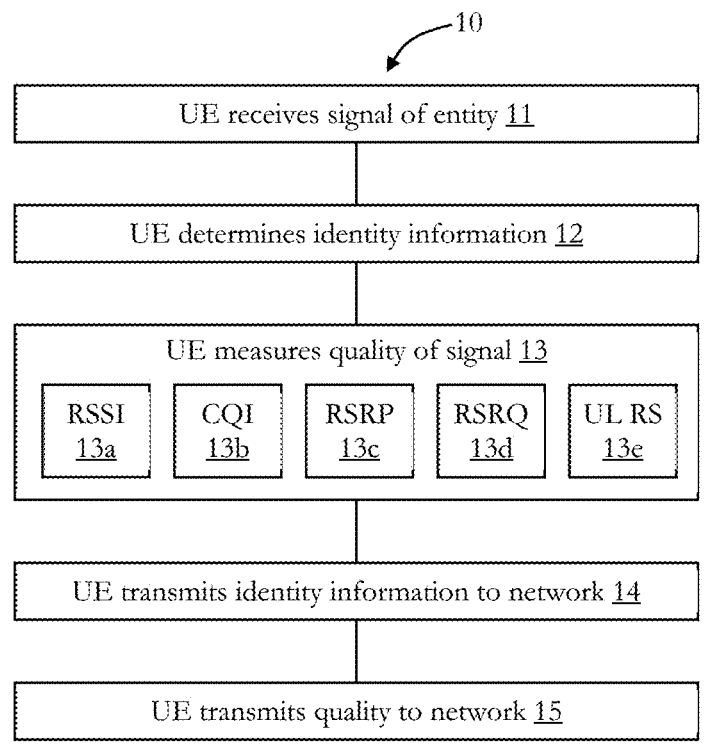
FIG. 2 illustrates a method for determining an entity emitting a signal.

FIG. 2 shows a method 10 for determining an entity 5 emitting a signal, such that it may be a source of interference. In the embodiment of FIG. 2, the entity 5 is an entity of a RAN, which may be the RAN 1 or any other RAN, and may use the Radio Access Technology (RAT) used in the RAN 1 or any other RAT. For example, the entity 5 may be a mobile base station, a mobile Transmission-Reception Point (TRP), or a UE.

At 11, the UE 4 receives the signal emitted by the entity 5.

At 12, the UE 4 determines, based on the signal received at 11, identity information about the entity 5, which has emitted the signal received at 11. The identity information may contain, for example, information about an identifier of the entity 5, information about the RAN the entity 5 belongs to, information about a RAT used by the entity 5, information about a network operator operating the entity 5 or the RAN the entity 5 belongs to, information about a frequency range used by the entity 5, information about a signal power used by the entity 5, information about a location of the entity 5, or any other information which, taken on its own or in combination with any other information, may be used to determine an identity of the entity 5.

At 13, the UE 4 measures a quality of the signal received at 11. The quantity measured as quality may be, for example, a Received Signal Strength Indicator (RSSI) 13a, a Channel Quality Indicator (CQI) 13b, a Reference Signal Received Power (RSRP) 13c, a Reference Signal Received Quality (RSRQ) 13d, an uplink (UL) reference signal (RS) 13e emitted from the entity 5 in a Physical Random Access Channel (PRACH), or any combination thereof.

At 14, the UE 4 transmits the identity information determined at 12 to the RAN 1, for example by transmitting the identity information to the base station 3.

At 15, the UE 4 transmits the quality of the signal to the RAN 1, for example by transmitting the quality of the signal to the base station 3.

In some embodiments, the UE 4 may not measure the quality of the signal and may therefore omit 13 and 15.

In some embodiments, the identity information and/or the quality of the signal may be used to identify the entity 5 emitting the signal and/or to avoid or reduce an electromagnetic interference of the signal with an entity of the RAN 1.

Figure 3:
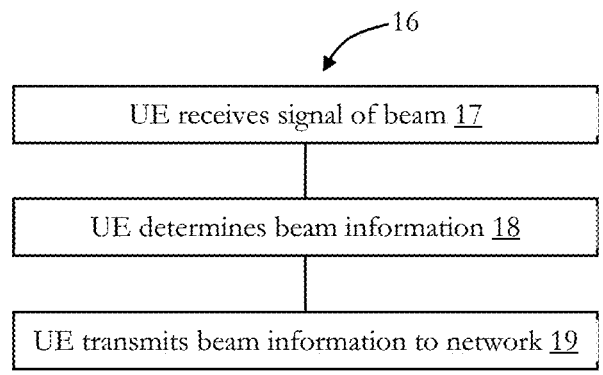
FIG. 3 illustrates a method for determining a beam.

FIG. 3 shows a method 16 for determining a beam. For example, the entity 5 may be a base station, a mobile base station, or any other entity of a RAN using beam-forming, and a beam emitted by the entity 5 may interfere with the connection between the UE 4 and the base station 3.

At 17, the UE 4 receives a signal from the beam.

At 18, the UE 4 determines, based on the signal, beam information, which may comprise any information that can be used to identify the beam or the entity 5.

At 19, the UE 4 transmits the beam information to the RAN 1, for example by transmitting the beam information to the base station 3.

In some embodiments, the beam information may be used to identify the beam or the entity 5 emitting the beam, and/or to avoid or reduce an electromagnetic interference of the beam with an entity of the RAN 1.

Figure 4:
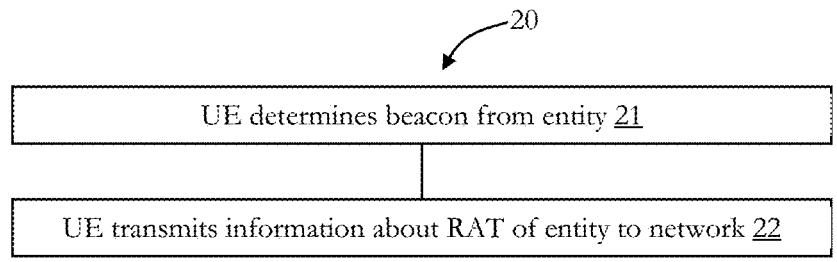
FIG. 4 illustrates a method for determining a Radio Access Technology of an entity.

FIG. 4 shows a method 16 for determining the Radio Access Technology (RAT) of an entity 5. For example, the entity 5 may emit a signal based on a RAT different from the RAT of the connection between the UE 4 and the base station 3, and the signal may interfere with the connection between the UE 4 and the base station 3. For example, the entity 5 may be a Wi-Fi access point, and the RAT of the entity 5 may be based on IEEE 802.11.

At 21, the UE 4 determines a beacon emitted by the entity 5 based on the RAT of the entity 5.

At 22, the UE 4 transmits information about the RAT of the entity 5 to the RAN 1, for example by transmitting the information about the RAT of the entity 5 to the base station 3.

In some embodiments, the UE 4 may determine the RAT of the entity 5 based on the beacon.

In some embodiments, the information about the RAT of the entity 5 may be used to avoid or reduce an electromagnetic interference of a signal emitted by the entity 5 with an entity of the RAN 1.

Figure 5:
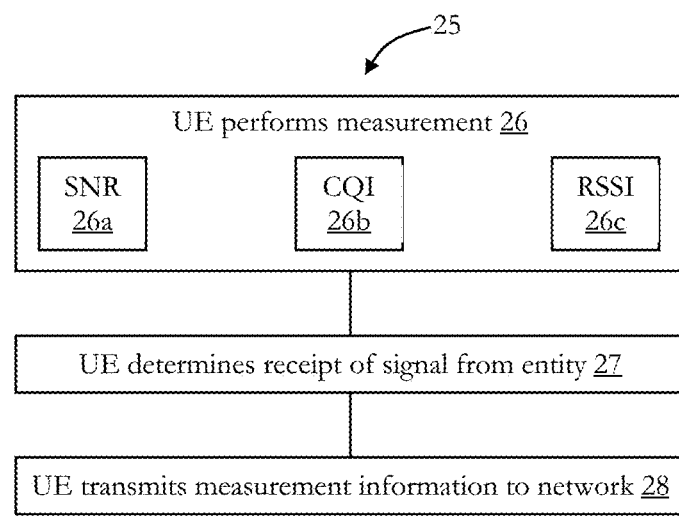
FIG. 5 illustrates a method for measuring a signal emitted by an entity.

FIG. 5 shows a method 25 for measuring a signal emitted by an entity 5. For example, the signal emitted by the entity 5 may interfere with the connection between the UE 4 and the base station 3. At 26, the UE 4 performs a measurement. The measurement may be, for example, a Signal-to-Noise Ratio (SNR) measurement 26a, a Channel Quality Indicator (CQI) measurement 26b, a Received Signal Strength Indicator (RSSI) measurement 26c, or any combination thereof.

At 27, the UE 4 determines, based on the measurement performed at 26, receipt of a signal originating from the entity 5.

At 28, the UE 4 transmits measurement information, which is based on a result of the measurement performed at 26, to the RAN 1, for example by transmitting the measurement information to the base station 3.

In some embodiments, the measurement information may be used to avoid or reduce an electromagnetic interference of a signal emitted by the entity 5 with an entity of the RAN 1.

Figure 6:
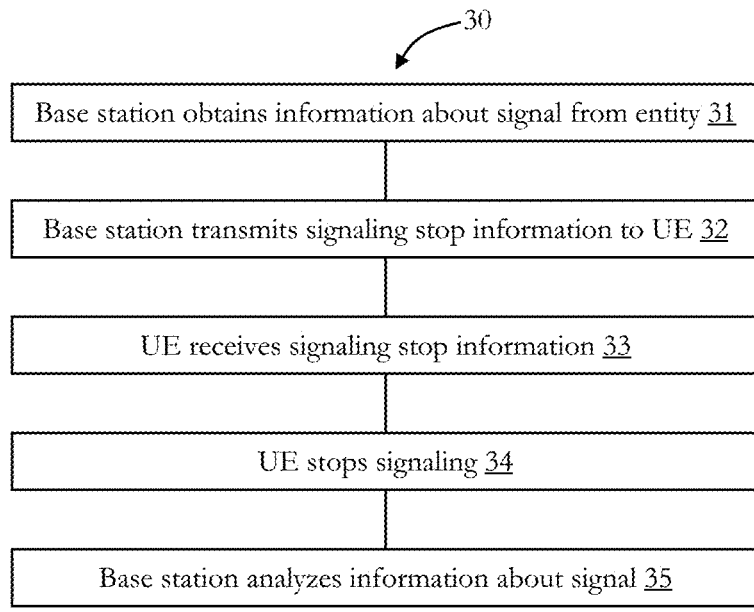
FIG. 6 illustrates a method for stopping signaling for analysis of a signal.

FIG. 6 illustrates a method 30 for stopping signaling of a user equipment, such as UE 4 of FIG. 1, for analysis of a signal, which may be performed by a base station (e.g. NR or LTE eNodeB).

At 31 the base station obtains information about a signal which may cause an interference from an entity, such as entity 5.

At 32, the base station transmits signaling stop information to the UE, in order to cause the UE to stop signaling. The signaling stop information may be, for example, a bit or the like which is included in other information transmitted to the UE.

At 33, the UE receives the signaling stop information and stops signaling at 34.

At 35, the base station analyzes information about the signal, in order to identify interferences. As the UE has stopped signaling, the detection accuracy may be enhanced.

Figure 7:
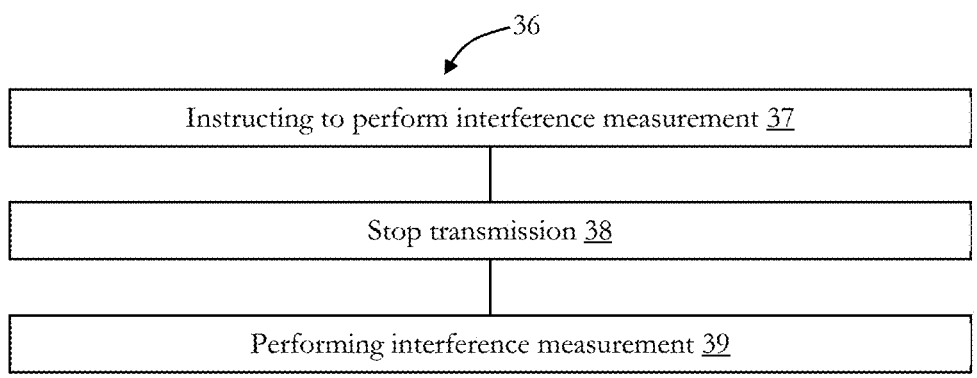
FIG. 7 illustrates a method for stopping transmission for interference measurement.

FIG. 7 illustrates a method 36 for stopping signaling of a base station, e.g. NR or LTE eNodeB, for a predetermined time, such that a user equipment, such as UE 4 of FIG. 1, can perform an interference measurement at least partially during the predetermined time.

At 37, the base station causes the UE to perform an interference measurement, as discussed above, by instruction the UE accordingly.

At 38, the base station stops transmission of signals for a predetermined time.

Figure 8:
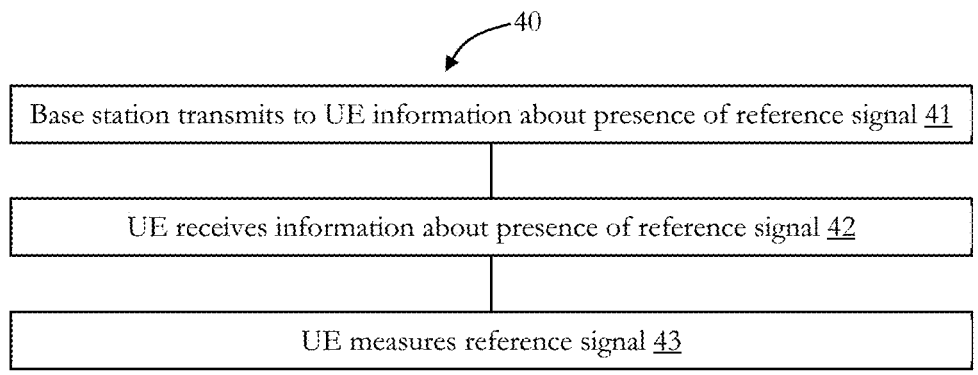
FIG. 8 illustrates a method for notifying a user equipment of a presence of a reference signal.

At 39, the UE performs the interference measurement during the base station stops transmission FIG. 8 illustrates a method 40 for notifying a user equipment of a presence of a reference signal.

At 41, a base station (e.g. LTE or NR eNodeB) may transmit information about presence of one or more reference signals to an UE.

At 42, the UE receives the information about the presence of reference signals and measures the reference signals accordingly at 43.

Figure 9:
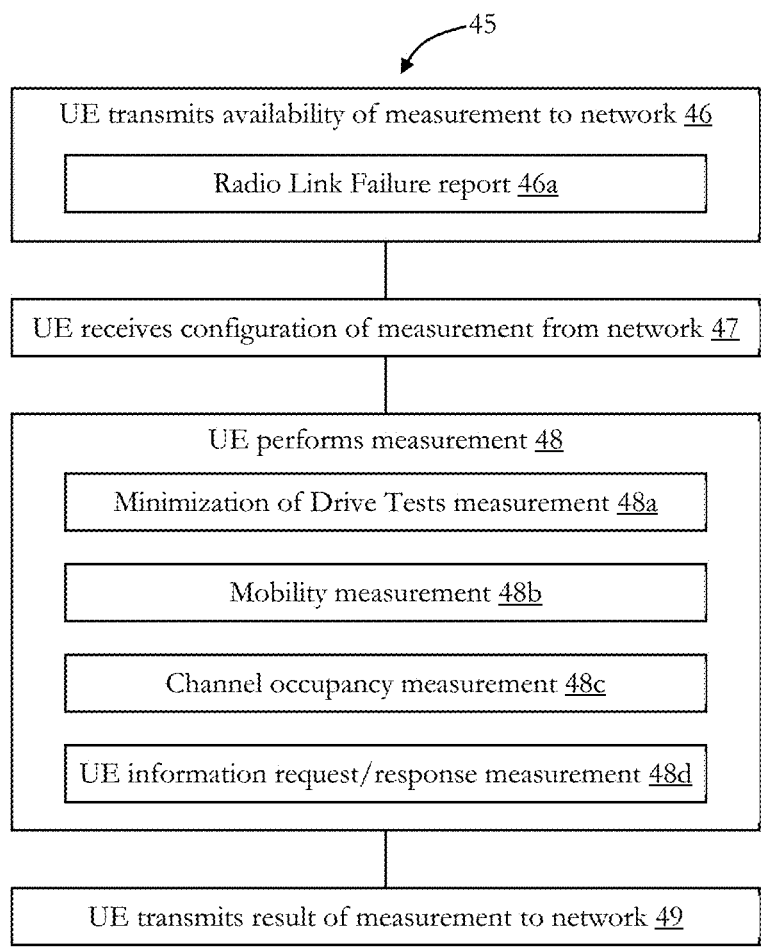
FIG. 9 illustrates a method for performing a measurement by network configuration.

FIG. 9 illustrates a method 45 for performing a measurement by a network configuration.

At 46, a UE transmits availability of measurement to network, e.g. to a base station, such as LTE eNodeB or NR eNodeB. This may include the transmission of a Radio Link Failure report at 46a.

In response to the transmission at 46, the UE may receive configuration information from the network, e.g. from the base station, at 47.

Then, at 48, the UE performs the measurement in accordance with the configuration received at 47.

The measurement at 48 may involve or may be based on at least one of: Minimization of Drive Tests measurement at 48a, mobility measurement at 48b, channel occupancy measurement at 48c, and UE information request/response measurement at 48d.

At 49, the UE transmits the measurement results to the network for further analysis.

Figure 10:
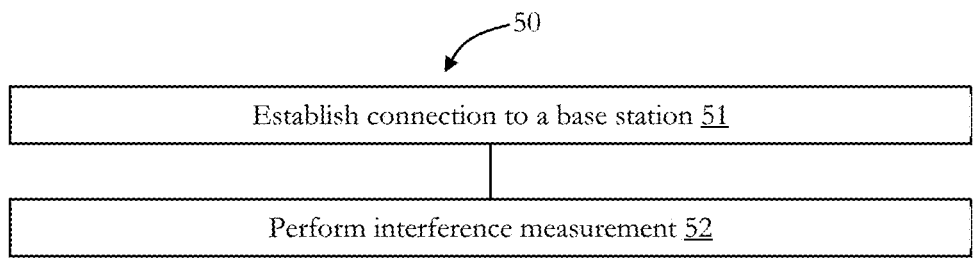
FIG. 10 illustrates a method for performing an interference measurement.

FIG. 10 illustrates a method 50 for performing an interference measurement, as discussed above, by a user equipment, such as UE 4 of FIG. 1.

At 51, the UE establishes a connection to a base station, e.g. eNodeB based on LTE or NR, at a first frequency. The establishing of a connection also includes camping of the UE.

At 52, The UE performs an interference measurement, as described above, at a second frequency. The second frequency is higher than the first frequency. The circuitry of the UE may have two different receivers, a first receiver which is adapted to operate at the first frequency and a second receiver, which is adapted to operate at the second frequency.

Figure 11:
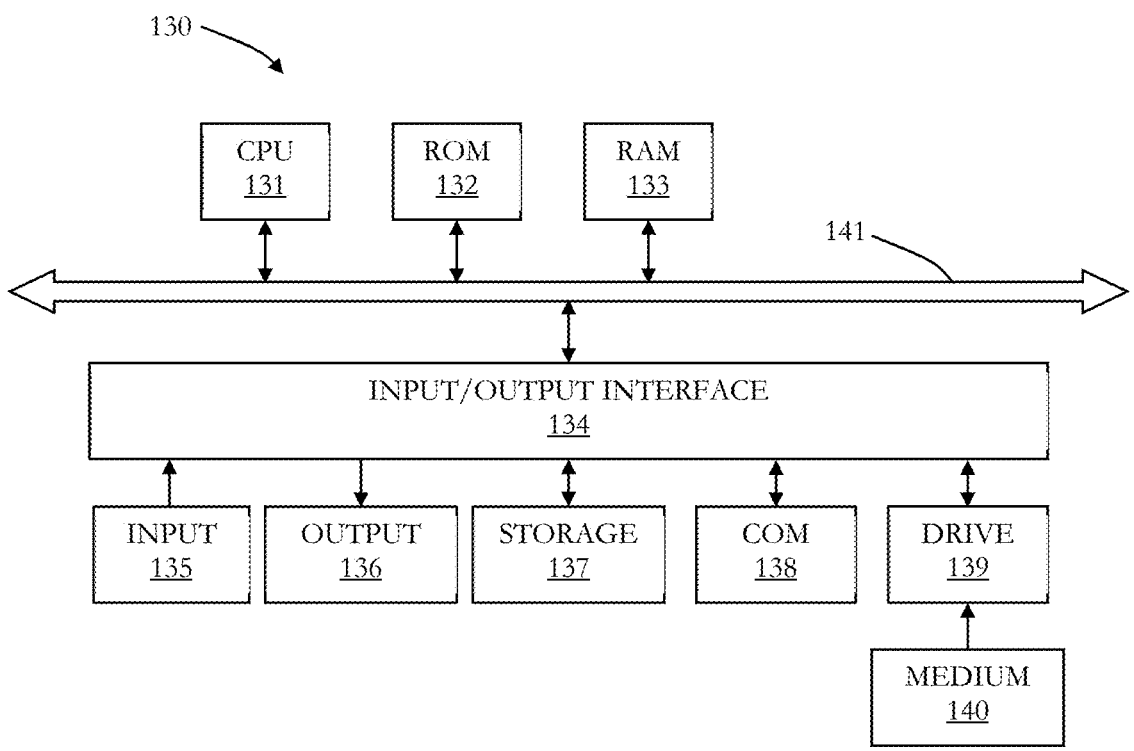
FIG. 11 schematically illustrates an exemplary embodiment of a general purpose computer.

In the following, an embodiment of a general purpose computer 130 is described under reference of FIG. 11. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipment, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station, and user equipment.

At the input/output interface 134 several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance to diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which to such a computer program is provided are envisaged as aspects of the present disclosure.

Note that the present technology can also be configured as described below.

(1) A user equipment for a mobile telecommunications network, comprising circuitry configured to:
receive a signal from an entity of a mobile telecommunications network, thereby determining identity information about the determined entity; and
transmit the identity information to the mobile telecommunications network for interferences analysis.

(2) The user equipment of (1), wherein the circuitry is further configured to
measure a quality of the received signal; and
transmit the quality of the received signal to the mobile telecommunications network.

(3) The user equipment of (2), wherein
the information about the quality of the received signal includes at least one of a Received Signal Strength Indicator, a Channel Quality Indicator, a Reference Signal Received Power, and a Reference Signal Received Quality.

(4) The user equipment of anyone of (1) to (3), wherein the identity information is identity information about a mobile base station.

(5) The user equipment of anyone of (1) to (3), wherein the identity information is identity information about a mobile Transmission-Reception
Point.

(6) The user equipment of anyone of (1) to (3), wherein the received signal is an uplink reference signal in a Physical Random Access Channel from the entity.

(7) A user equipment for a mobile telecommunications network, comprising circuitry configured to:
determine beam information, based on a received signal of the beam emitted by an entity of a mobile telecommunications network; and
transmit the beam information to the mobile telecommunications network for interferences analysis.

(8) A user equipment for a mobile telecommunications network, comprising circuitry configured to:
determine a beacon originating from an entity of a wireless network, which is based on a Radio Access Technology which differs from the Radio Access Technology of the mobile telecommunications network; and
transmit information about the Radio Access Technology to the mobile telecommunications network for interferences analysis.

(9) A user equipment for a mobile telecommunications network, comprising circuitry configured to:
determine receipt of a signal originating from an entity based on at least one of a Signal-to-Noise Ratio measurement, a Channel Quality Indicator measurement, and a Received Signal Strength Indicator measurement; and
transmit measurement information of the received signal to the mobile telecommunications network for interferences analysis.

(10) The user equipment of (9), wherein
the transmission of the measurement information is performed after termination of at least one of the Signal-to-Noise Ratio measurement, the Channel Quality Indicator measurement, and the Received Signal Strength Indicator measurement.

(11) A user equipment for a mobile telecommunications network, comprising circuitry configured to:
stop signaling for a predetermined time in response to receipt of signaling stop information from the mobile telecommunications network.

(12) A base station for a mobile telecommunications network, comprising circuitry configured to:
cause a user equipment to perform an interference measurement; and
stop transmission for a predetermined time, wherein the user equipment performs the measurement at least partially during the predetermined time.

(13) A base station for a mobile telecommunications network, comprising circuitry configured to:
obtain information about a signal originating from an entity;
transmit signaling stop information to a user equipment; and
analyze the information about the signal for determining the entity emitting the signal for interferences analysis.

(14) A user equipment for a mobile telecommunications network, comprising circuitry configured to:
receive, from the mobile telecommunications network, information about a presence of at least one reference signal to be measured; and
measure the at least one reference signal for interferences analysis.

(15) A base station for a mobile telecommunications network, comprising circuitry configured to:
transmit, to a user equipment of the mobile telecommunications network, information about a presence of at least one reference signal to be measured for interferences analysis.

(16) A user equipment for a mobile telecommunications network, comprising circuitry configured to:
receive, from the mobile telecommunications network, a configuration to perform a measurement on a received signal;
perform the measurement; and
transmit a result of the measurement to the mobile telecommunications network.

(17) The user equipment of (16), wherein
the measurement is performed as part of a Minimization of Drive Tests measurement configuration.
(18) The user equipment of (17), wherein the measurement is based on a configured measurement object including multiple frequencies.
(19) The user equipment of (16), wherein
the measurement is performed as part of a mobility measurement configuration.
(20) The user equipment of (16), wherein
the measurement is performed as part of a channel occupancy measurement configuration.
(21) The user equipment of (16), wherein
the measurement is performed as part of a user equipment information request/response configuration.
(22) The user equipment of anyone of (16) to (21), wherein the circuitry is further configured to
transmit an availability of the measurement to the mobile communications network.
(23) The user equipment of (22), wherein the circuitry is further configured to
transmit the availability as Radio Link Failure report.
(24) A base station for a mobile telecommunications network, comprising circuitry configured to:
configure a user equipment of the mobile telecommunications network to perform a measurement on a received signal.
(25) The base station of (24), wherein
the measurement is performed as part of a Minimization of Drive Tests measurement configuration.
(26) The base station of (24), wherein
the measurement is performed as part of a mobility measurement configuration.
(27) The base station of (24), wherein
the measurement is performed as part of a channel occupancy measurement configuration.
(28) The base station of (24), wherein
the measurement is performed as part of a user equipment information request/response configuration.
(29) The base station of anyone of (24) to (28), wherein the circuitry is further configured to
receive, from the user equipment, an availability of the measurement.
(30) The base station of (29), wherein the circuitry is further configured to
receive the availability as Radio Link Failure report.
(31) A user equipment for a mobile telecommunications network comprising circuitry configured to:
establish a connection to an entity at a first frequency; and
perform an interference measurement at a second frequency, the second frequency being higher than the first frequency.

The invention claimed is:

1. A base station for a mobile telecommunications network, the base station comprising:
circuitry configured to:
obtain, from a user equipment, signal information about a signal, the signal originating from an interfering device operating in a wireless local area network (WLAN);
transmit signaling stop information to the user equipment; and
analyze the signal information to determine the interfering device emitting the signal for an interferences analysis, wherein
in a case that the user equipment detects a beacon of the WLAN, the signal information indicates a type of the interfering device based on the beacon.

2. The base station of claim 1, wherein the circuitry is further configured to configure the user equipment to perform a measurement on the signal.

3. The base station of claim 2, wherein the measurement is performed as part of a Minimization of Drive Tests measurement configuration.

4. The base station of claim 2, wherein the measurement is performed as part of a mobility measurement configuration.

5. The base station of claim 2, wherein the measurement is performed as part of a channel occupancy measurement configuration.

6. The base station of claim 2, wherein the measurement is performed as part of a user equipment information request/response configuration.

7. The base station of claim 2, wherein the circuitry is further configured to receive, from the user equipment, an availability of the measurement.

8. The base station of claim 7, wherein the circuitry is further configured to receive the availability as Radio Link Failure report.

9. A base station for a mobile telecommunications network, the base station comprising:
circuitry configured to:
configure a user equipment of the mobile telecommunications network to perform a measurement on a signal originating from an interfering device operating in a wireless local area network (MILAN); and
transmit signaling stop information to the user equipment, wherein
the user equipment identifies a type of the interfering device based on a beacon from the WLAN which is detected by the user equipment,
the user equipment performs the measurement on the signal, and
the circuitry is further configured to receive identity information from the user equipment, the identity information identifying the type of interfering device.

10. The base station of claim 9, wherein the measurement is performed as part of a Minimization of Drive Tests measurement configuration.

11. The base station of claim 9, wherein the measurement is performed as part of a mobility measurement configuration.

12. The base station of claim 9, wherein the measurement is performed as part of a channel occupancy measurement configuration.

13. The base station of claim 9, wherein the measurement is performed as part of a user equipment information request/response configuration.

14. The base station of claim 9, wherein the circuitry is further configured to receive, from the user equipment, an availability of the measurement.

15. The base station of claim 14, wherein the circuitry is further configured to receive the availability as Radio Link Failure report.

* * * * *